United States Patent [19]
Diemer et al.

[11] Patent Number: 5,801,460
[45] Date of Patent: Sep. 1, 1998

[54] ELECTRICAL POWER TRANSMITTING SYSTEM WITH REDUCED FEEDER SIZE AND METHOD OF OPERATION

[75] Inventors: John W. Diemer, Rockford; Jack B. Miller, Caledonia, both of Ill.

[73] Assignee: Sundstrand Corporation, Rockford, Ill.

[21] Appl. No.: 683,833

[22] Filed: Jul. 18, 1996

[51] Int. Cl.$^6$ .................................................. G05F 1/70
[52] U.S. Cl. .................................. 307/129; 307/31; 307/32; 307/34; 307/125; 323/205; 323/208; 323/209; 363/39; 318/729
[58] Field of Search ................................ 307/129, 125, 307/126, 31, 32, 34, 35; 323/205, 208, 209; 363/39; 318/729

[56] References Cited

U.S. PATENT DOCUMENTS

| | | | |
|---|---|---|---|
| 2,294,773 | 9/1942 | Crary | 172/237 |
| 4,313,081 | 1/1982 | Smith | 323/209 |
| 4,672,298 | 6/1987 | Rohatyn | 323/208 |
| 5,032,738 | 7/1991 | Vithayathil | 307/112 |
| 5,051,685 | 9/1991 | Sink | 323/208 |
| 5,227,962 | 7/1993 | Marsh | 363/39 |

FOREIGN PATENT DOCUMENTS

0570839A2  11/1993  Germany .

OTHER PUBLICATIONS

Patent Abstract of Japan, vol. 13, No. 421 (E–822), 19 Sep. 1989; Applicant: Nippon Seimitsu Keisoku KK; Int. Cl. H02J 3/00 H02J 3/12; Title: *Power Saving and Regulated Voltage Feed System*.

Primary Examiner—William M. Shoop, Jr.
Assistant Examiner—Albert W. Paladini
Attorney, Agent, or Firm—Antonelli, Terry, Stout & Kraus, LLP

[57] ABSTRACT

An electrical power transmitting system (50) in accordance with the invention includes an alternating current electrical power generator (12) for producing alternating current on an output having a specified maximum; at least one electrical load (22) which is coupled to a point of regulation (16) in the electrical transmitting system; a feeder (14) having a specified maximum voltage drop, a length extending between the output and the point of regulation for transmitting the alternating current to the point of regulation, an inductance having an inductive reactance at a fundamental frequency of the alternating current, a capacitance (54, 66, 80 and 100) in series with the inductance having a capacitive reactance at the fundamental of the frequency of the alternating current which cancels at least part of the inductive reactance at the fundamental frequency of the alternating current to provide a reduced impedance in the feeder at the fundamental frequency of the alternating current to produce a reduced voltage drop which is less than the specified voltage drop; and the feeder having a minimum weight per unit length providing a maximum current carrying capacity equal to the specified maximum at the reduced voltage drop.

21 Claims, 8 Drawing Sheets ic POWER TRANSMITTING SYSTEM WITH REDUCED FEEDER SIZE AND METHOD OF OPERATION

TECHNICAL FIELD

The present invention relates to electrical power transmitting systems having minimized feeder weight and more particularly, to electrical power generating systems for use in airframes having reduced feeder weight.

BACKGROUND ART

FIG. 1 illustrates a simplified block diagram of an electrical power transmitting system 10 of the type used in commercial jet aircraft. The electrical power transmitting system has been simplified to illustrate generation of power from only a single propulsion engine. In a typical electrical power transmitting system, each propulsion engine has an integrated drive generator 12 which converts a variable speed shaft output into a constant speed drive of a three phase alternator for generating three phase 400 Hz. alternating current. The Assignee of the present invention manufactures integrated drive generators 12 which are rated in kilovolt amperes (KVA) applied as a sustained electrical real power load. The IDG 12 has a feeder 14 which is an electrical power transmission line which typically extends for distances of up to and over 100 feet between each IDG and a point of regulation (POR) 16 at which the sustained rated real power is applied at a specified electrical potential such as 115 volts. The point of regulation 16 is connected through a contactor 18, which is provided to isolate the IDG 12 against fault conditions, and through a plurality of breakers 20 to a plurality of electrical loads 22 which may be diverse in nature. Because the IDG 12 has a rating in KVA and the point of regulation 16 is specified to be at or above a minimum voltage which must be sustained during driving all of the loads 22, the size of the feeder 14 is chosen to have a maximum voltage drop. Typical maximum voltage drops across the feeder 14 are less than 8 volts.

Because of the airframe manufacturer's specification of a minimum voltage at the point of regulation 16, it is necessary that the feeder 14 be sized with heavy wire to insure that excessive voltage drop across the feeder does not occur for either leading or lagging power factors produced by the loads 22. A voltage drop across the feeder 14 which drops the voltage at the point of regulation below the minimum required for proper operation of the electrical loads 22 is not permitted.

FIG. 2 illustrates a voltage drop across a typical feeder 14 with a load unity power factor with the output potential from the IDG 12 $V_{SOURCE}$ of 119 volts. The point of regulation potential $V_{POR}$ is set at 115 volts and the total voltage drop $V_{FEEDER}$ across the feeder impedance is 7.79 volts. As may be seen from FIG. 2, the impedance of the feeder has a resistive component which drops a voltage $V_{RAC}$ and an inductive reactive component which drops a voltage $V_{XL}$ to provide the net voltage drop $V_{FEEDER}$. The current I is totally in phase with the voltage drop across the electrical load.

FIG. 3 illustrates a diagram of the voltage drop across the same feeder 14 as in FIG. 2 with a load lagging power factor of 0.75. As may be seen from FIG. 3, where the same voltage identifications are used as in FIG. 2, the voltage $V_{SOURCE}$ is 122.4 volts, the voltage at the point of regulation $V_{POR}$ is 115 volts and the voltage drop $V_{FEEDER}$ across the feeder is 7.79 volts.

FIG. 4 illustrates a diagram of voltage drop across the same feeder 14 as in FIGS. 2 and 3 with a load leading power factor 0.95. The same identifications are used to identify voltage drops in FIGS. 4 as have been used in FIGS. 2 and 3. The voltage $V_{SOURCE}$ is 116.8 volts, the voltage at the point of regulation $V_{POR}$ is 115 volts and the drop $V_{FEEDER}$ across the feeder is 7.79 volts.

From a comparison of FIGS. 2–4, it is seen that the feeder voltage drop $V_{FEEDER}$ is independent of the load current power factor. Furthermore, while the potential at the point of regulation $V_{POR}$ is 115 volts and the voltage drop across the feeder $V_{FEEDER}$ is 7.79 volts, the voltage at the source $V_{SOURCE}$ must change to compensate for the difference in the power factor. As the load current power factor varies, the resultant source voltage $V_{SOURCE}$ necessary to maintain the 115 volts at the point of regulation must vary. In a worse case condition, the load current power factor is the same as the feeder equivalent power factor (0.49 lag) which requires the voltage $V_{SOURCE}$ at the source to be 122.8 volts.

FIG. 5 illustrates a diagram of a proposed electrical power transmitting system in a proposed large four jet engine aircraft having a capacity of approximately 800 persons. The diagram only illustrates a portion of the electrical power transmitting system 40 which extends between four 150 KVA IDGs 12 each outputting a rated 435A of real power to the point of regulation 16. The remaining electrical bus structure, including the contactor 18, and breakers 20 and electrical loads 22 of FIG. 1, have been omitted for purposes of simplifying the illustration. In this proposed passenger aircraft, the length of the outer two feeders 14 is 150 feet and the length of the inner two feeders is 100 feet for a total of 500 feet of feeder. The feeders in this proposed aircraft require 2-4/0 per phase electrical wire to achieve the objective of a maximum of an 8 volt drop across the feeder 14. The total main feeder weight from the four IDGs 12 to the point of regulation 16 which equals 3000 feet of 4/0 Al wire will be approximately 866 pounds (lbs.). The actual voltage drop across the feeder is proportional to the net feeder impedance.

The design of electrical power generating systems in airframes places a premium upon weight reduction. Any reduction in weight results in decreased operating costs, greater range and greater passenger/cargo carrying capacity.

In 400 Hz. ground electrical power applications, a capacitor has been used to cancel the inductive voltage drop of a feeder to increase the distance that the 400 Hz. electrical power may be distributed within a specified voltage drop across the feeder. The point of regulation in ground based systems is at the generator and therefore, is not influenced by the line drop across the feeder. In ground based systems, achieving a maximum distance of power transmission is of significance. The cancellation of the inductive voltage drop by a capacitance in 400 Hz. ground power applications is not used to reduce the size of the feeder.

DISCLOSURE OF THE INVENTION

The present invention is an electrical power transmitting system and method of transmitting electrical power in an electrical power transmitting system for applications in which reduction in weight of the feeder is a significant design consideration such as in airframes. The present invention minimizes the weight of the feeder and reduces the weight of a feeder used for transmitting electrical power from an alternating current electrical power generator to a point of regulation compared to the current industry practice.

The current industry practice determines the feeder wire size based only upon the maximum voltage drop across the feeder specified by the airframe manufacturer without compensation for the inductance therein. The inductance increases the voltage drop for any given wire size requiring a larger wire size to achieve operation within the airframe manufacturer's specified maximum feeder voltage drop than would be required if the inductive reactance was substantially cancelled at the fundamental frequency of the alternating current being transmitted when the choice of feeder wire size is being made. In accordance with the invention, the inductive reactance of a feeder is cancelled at least in part by a feeder reactance compensator which couples capacitance in series with the inductance of the feeder to reduce the impedance of the feeder. As a result of the decrease in the feeder impedance, in comparison to the feeder impedance which would be present without capacitive compensation, the voltage drop across the feeder is reduced to allow use of feeder wire having a reduced weight by unit length for transmitting the transmitting system's rated real current.

The weight per unit length of the feeder is reduced to a minimum by sizing the feeder for the reduced voltage drop produced by capacitive compensation at the rated maximum current carrying capacity of the transmitting system such as 435A as discussed above. The smaller voltage drop across the feeder resultant from cancellation of the inductive reactance by the insertion of a capacitance in series with the inductive reactance permits the downsizing of the cross sectional current carrying area of the feeder which produces a resultant weight savings to minimize feeder weight.

A potential for savings of up to half of the weight of the feeder is achievable with the present invention taking into consideration the additional weight required to add the compensating capacitance in series with the feeder. The resultant weight savings provides a substantial long term benefit for applications, such as in airframes, where increased operational efficiency, additional payload and increased range are achieved by a reduction in weight.

The coupling of a capacitance in series with the feeder to cancel at least in part the inductance therein to lower the impedance of the feeder may be accomplished in many different ways. In a fixed frequency power transmitting system, either a capacitor directly in series with the feeder or a current transformer having a capacitor in series with the secondary thereof may be used. The current transformer reflects the capacitance of the secondary into the primary which increases the capacitance in the primary equal to the square of the turns ratio times the capacitance in the secondary.

Furthermore, for electrical power transmitting systems which transmit alternating current varying in frequency, one of a plurality of different capacitive values may be selectively connected in series with the feeder. The selective connection may be produced in a number of different ways. A parallel circuit comprised of a plurality of series circuits each having a capacitor in series with the switching element may be connected in series with the feeder. Each switching element may be selectively activated by a control voltage for connecting in series with the feeder compensating capacitor having a capacitance chosen for the particular frequency range within the variable frequency range of operation of the electrical power transmitting system.

The control of switching of the switching elements may be accomplished by a control circuit having a frequency to voltage converter which generates a voltage proportional to the frequency of operation of the electrical power transmitting system. That proportional voltage is applied through a series of comparators and logic gates to produce an output connected to a control terminal of each switching element to apply a high level voltage thereto when the electrical power transmitting system is operating within a frequency range in which the capacitance for cancelling the greatest amount of the inductance of the feeder should be inserted in series with the feeder.

Alternatively, the aforementioned parallel circuit having a plurality of series circuits each containing a capacitor in series with a switching element may be connected in parallel to the secondary of a current transformer. The selective connecting of one of the capacitive values in parallel with the secondary of the current transformer reflects the capacitance of the secondary into the primary to introduce a capacitance in the primary equal to the square of turns ratio multiplied times the selected capacitance of the secondary which facilitates using smaller capacitors. This mode of operation has a benefit of making it possible to cancel a significant portion of the inductive reactance of the feeder with smaller commercially available capacitors with the only disadvantage being the weight added by the current transformer which is at least partially offset by the savings in weight in using smaller capacitors in the series circuits connected in parallel with the secondary.

As used herein, the terminology "maximum current carrying capacity" is the maximum current a conductor can carry without heating beyond a safe limit. A feeder with a maximum current carrying capacity is a feeder which has the minimum weight per unit length which can safely carry a current equal to the maximum current rating of an electrical power transmitting system.

BRIEF DESCRIPTION OF THE DRAWINGS

Like reference numerals identify like parts throughout the drawings.

BEST MODE FOR CARRYING OUT THE INVENTION

Figure 1:
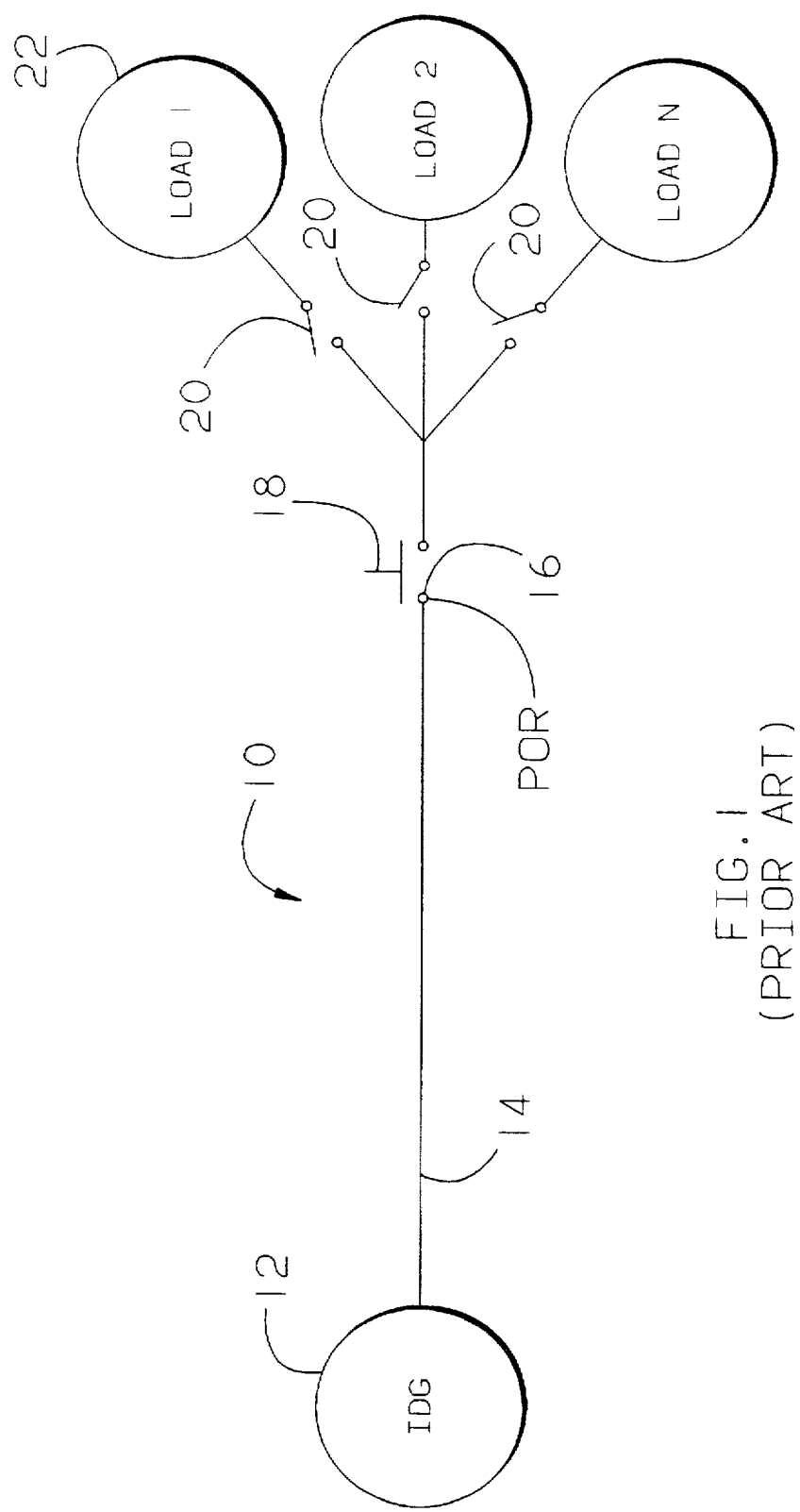
FIG. 1 illustrates a block diagram of a prior art electrical power transmitting system.
Figure 2:
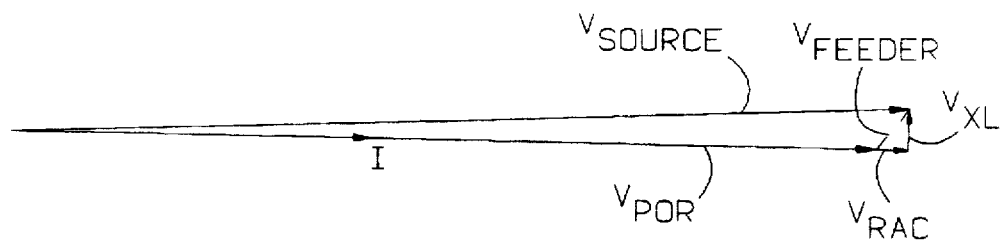
FIGS. 2–4 illustrate the operation of a feeder in a prior art electrical power transmitting system having respectively a unity, lagging and leading power factor.
Figure 3:
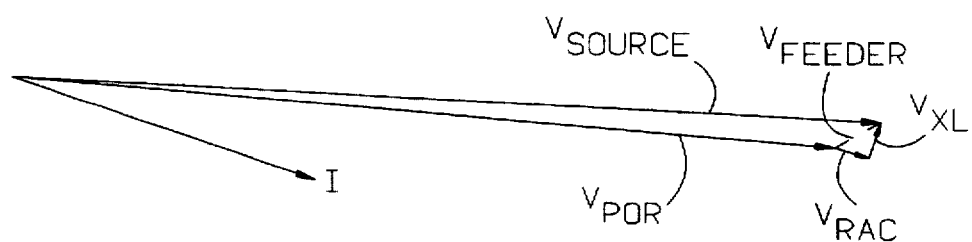
Figure 4:
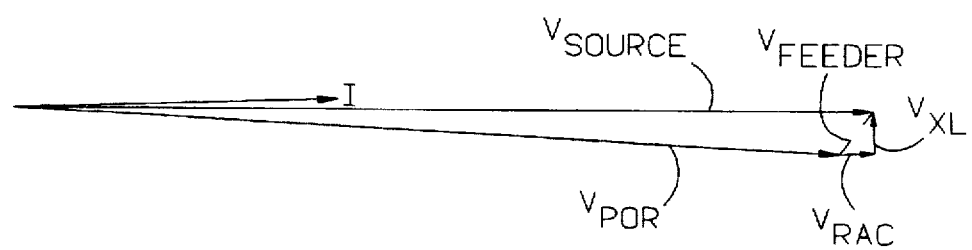
Figure 6:
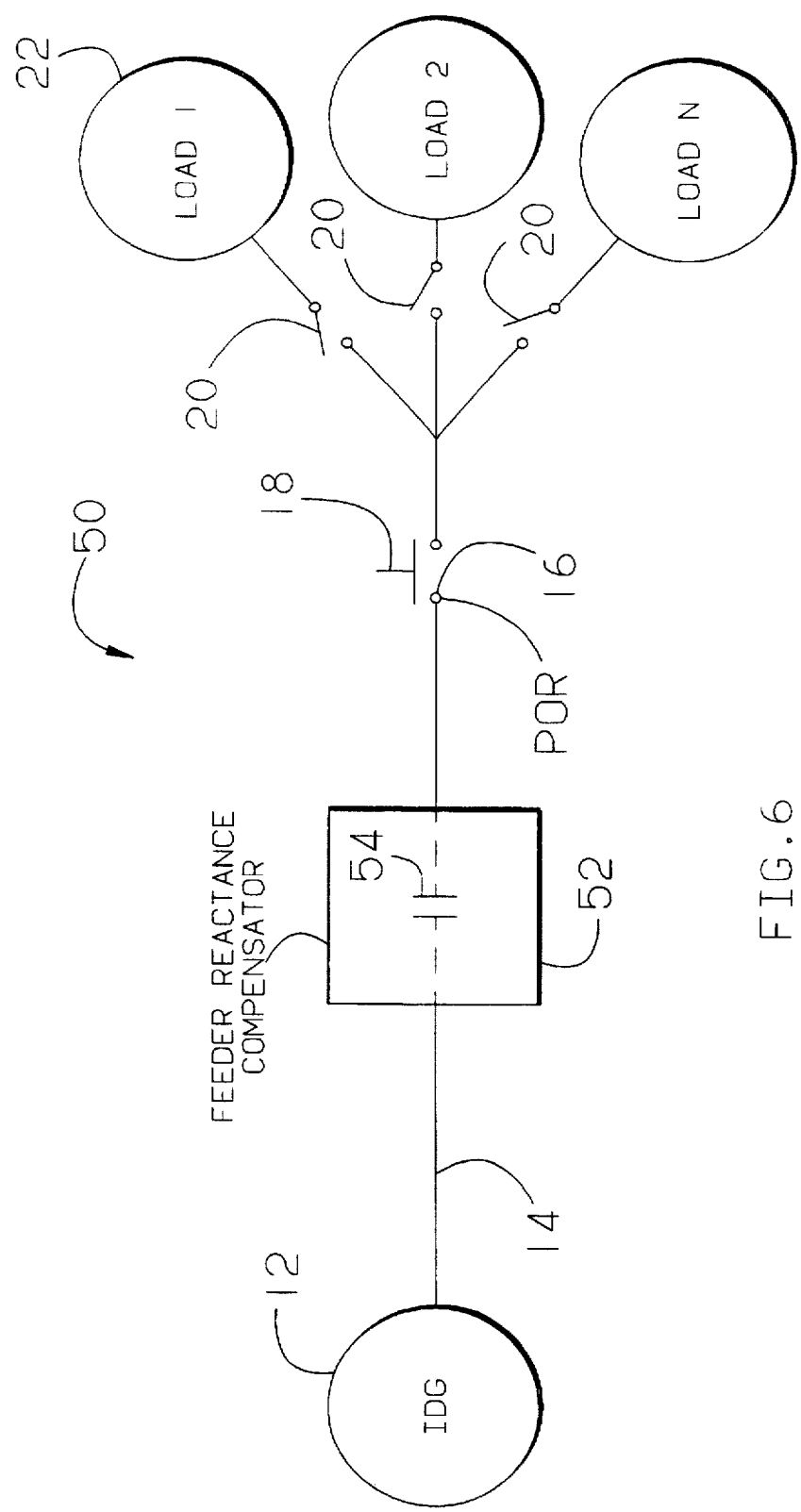
FIG. 6 illustrates a block diagram of an electrical power transmitting system in accordance with the present invention.

FIG. 6 illustrates a block diagram of an electrical power transmitting system 50 in accordance with the present invention. The electrical power transmitting system 50 is identical to the prior art of FIG. 1 with the exception that a feeder reactance (capacitive) compensator 52 is connected in series with the feeder 14 to provide a capacitance in series with the feeder having a capacitive reactance at the fundamental frequency of the alternating current which cancels at least a part of the inductive reactance of the feeder at the fundamental frequency of the alternating current to provide a reduced impedance in the feeder at the fundamental frequency of the alternating current. The feeder reactance compensator 52 functions, as stated above, to add in series with the inductive reactance of the feeder 14 capacitive reactance which at least in part cancels the inductive reactance of the feeder at the operational fundamental frequency at which alternating current is being transmitted by the electrical power transmitting system 50. The feeder reactance compensator may have diverse designs, such as, but not limited to, those described below in conjunction with FIGS. 7–11.

The addition of capacitance in series with the inductance of the feeder 14 reduces the feeder impedance because it is rendered substantially resistive at the fundamental frequency of the transmitter alternating current. Operation of the electrical power transmitting system at the maximum transmitting system rated current with the capacitive compensation reduces the voltage drop across the feeder 14. The reduced voltage drop permits a lighter weight feeder having a (when compared to feeders designed for operation with a maximum feeder drop without capacitive compensation) minimum weight per unit length to be used to operate the system within the maximum feeder voltage drop specification of the airframe manufacturer at the system rated maximum current.

In its simplest form, the feeder reactance compensator 52 is a capacitor connected in series with the feeder 14 as indicated in phantom inside of the feeder reactance compensator 52. One disadvantage of using a single capacitor 54 in series with the feeder 14 to cancel at least in part the inductive reactance of the feeder for electrical power transmitting systems having high KVA ratings, such as 50 KVA and above, which are common in airframe electrical power transmitting systems, is that there is no inexpensive source of commercially available light weight capacitors of sufficient capacity.

Figure 7:
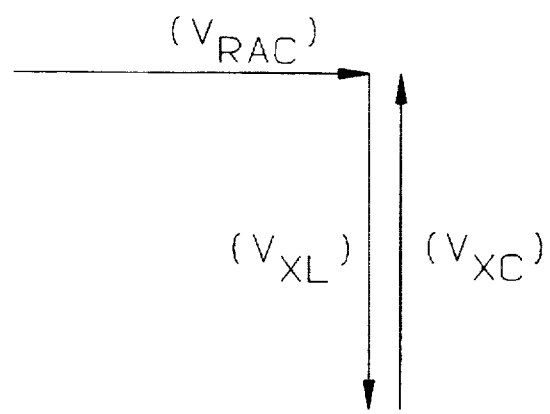
FIG. 7 illustrates a diagram illustrating the cancellation of inductive reactance in a feeder with a capacitance in series with the inductance in accordance with the present invention.

FIG. 7 illustrates the voltage diagram illustrating the cancellation of the voltage drop across feeder 14 resultant from the inductance therein by the insertion of a capacitor such as the capacitor 54 as illustrated in FIG. 6, in series with the feeder 14. The voltage drop across the feeder due to the resistance therein is $V_{RAC}$. The voltage drop caused by the inductance of the feeder 14 $V_{XL}$ is 90° out of phase with the resistive voltage drop and is offset by the capacitive reactance voltage drop $V_{XC}$ to produce a substantially purely resistive voltage drop. The reduced voltage drop across the feeder 14, because of cancellation of at least part of the inductive reactance of the feeder by the connection of a capacitance in series with the feeder 14, permits the feeder wire size to be downsized to a current carrying capacity based upon the resultant reduced voltage drop across the feeder. While FIG. 7 illustrates substantial cancellation of the inductive reactance with corresponding capacitive reactance produced by the connection of a capacitor in series with the inductive reactance, it is not a requirement of the present invention that a perfect cancellation of the inductive reactance be produced. Any net reduction in the impedance of the feeder 14 resultant from cancelling at least part of the feeder inductive reactance permits the downsizing of the feeder to a wire size equal to the maximum current carrying capacity of the chosen size of feeder wire for the reduced voltage drop.

Figure 8:
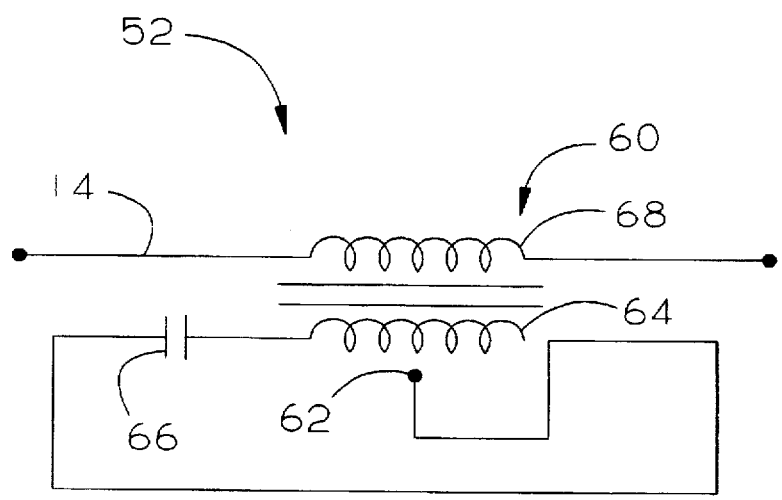
FIG. 8 illustrates a variable turns ratio current transformer for reflecting from the secondary a variable capacitance into the primary which is connected in series with the feeder.

FIG. 8 illustrates the use of a current transformer 60 having a variable turns ratio produced by a movable tap 62 or other equivalent mechanism in the secondary 64. This embodiment may be used for variable frequencies with a fixed capacitor or to permit different capacitors to be matched to the desired operation by varying the turns ratio. A capacitor 66 is in series with the secondary which is chosen to have a capacitive reactance for cancelling the inductive reactance of the feeder 14. The primary 68 is connected in series with the feeder 14. The turns ratio produced by the variation of the tap 62 in the secondary reflects a capacitance into the primary 68 which is equal to the value of the capacitance 66 times the square of the turns ratio. This permits smaller capacitors to be used in the secondary 64 to connect substantially larger capacitances to the primary 68 in series with the feeder 14 which are required to cancel the inductive reactance of the feeder.

Figure 9:
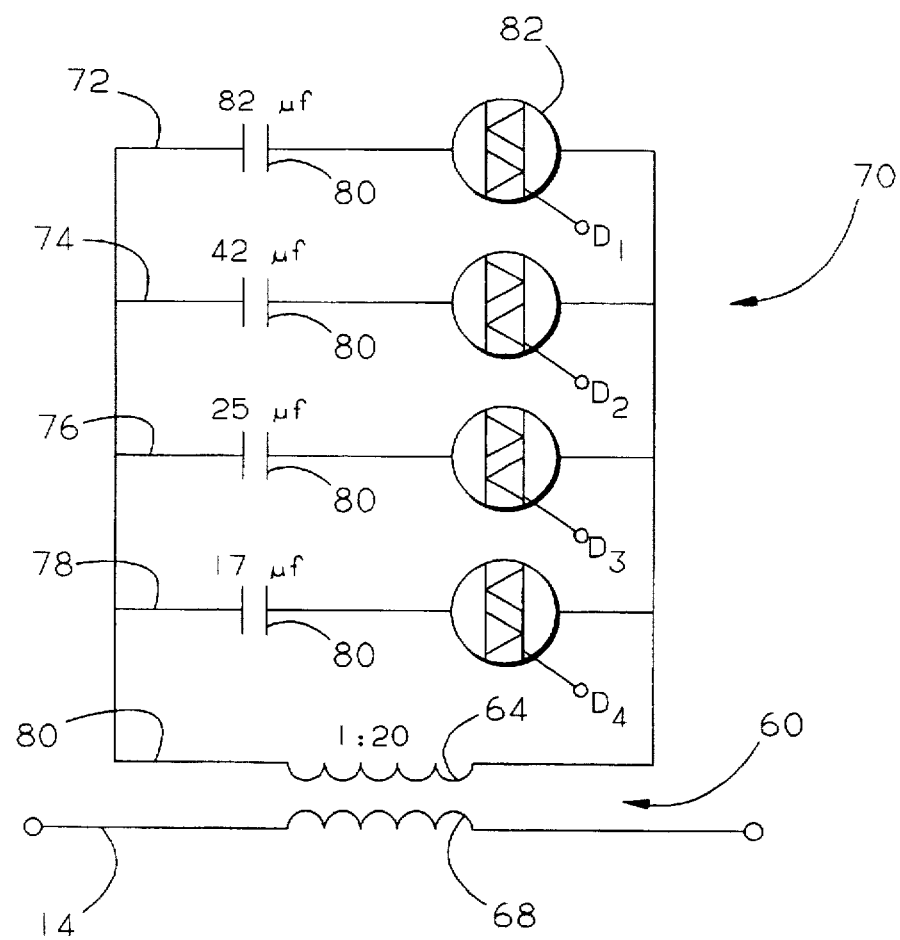
FIG. 9 illustrates an alternative use of a current transformer in which a plurality of series circuits each containing a different capacitor are connected in parallel to the secondary with the primary being connected in series with the feeder.

FIG. 9 illustrates the use of a current transformer 60 in association with a parallel circuit 70 comprised of a plurality of series circuits 72–80. This embodiment is intended for variable frequency operation. The series circuits 72–78 each contain a capacitor in series with a switching element 82, such as a triac, which is selectively activated by a control circuit, as illustrated in FIG. 11, to connect one of the capacitors 80 in series with the secondary 64 to reflect into the primary 68 a capacitance equal to the value of the capacitance in the series circuit in which the switching element is turned on times the square of the turns ratio which, as indicated, is 20.

The capacitance values, as illustrated in FIG. 9, have been chosen for a frequency range of operation between 200 and 600 Hz. which produce a voltage drop across the inductance of a 150 foot feeder of 4/0 aluminum rated at 435 amps of 8.47 volts at 250 Hz., 11.85 volts at 350 Hz., 15.24 volts at 450 Hz. and 18.63 volts at 550 Hz. The resultant 20:1 turns ratio reflects effective capacitance in to the primary produced by the 82 µF capacitance at 250 Hz. of 32,695 µF by the 42 µF capacitance at 350 Hz. of 16,692 µF, by the 25 µF capacitance at 450 Hz. of 10,095 µF and by the 17 µF capacitance at 550 Hz. of 6,757 µF. However, the reduction of the inductive reactance at the stated frequencies reduces the voltage drop across the feeder to produce substantial weight savings. Otherwise, without cancellation of the inductive reactance, proportionally larger wire would be required to insure that a maximum feeder drop is not exceeded.

Figure 10:
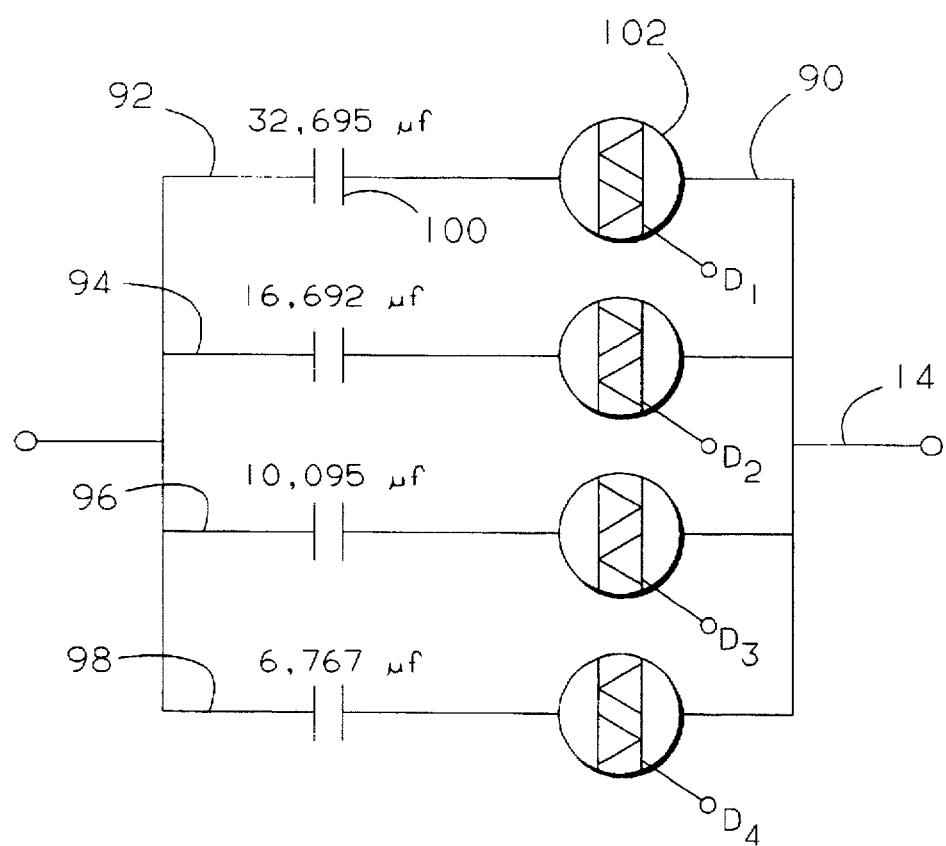
FIG. 10 illustrates a parallel circuit having a plurality of series circuits each containing a different capacitor and a switching element which is selectively closed to connect one of the capacitors in series with the feeder.

FIG. 10 illustrates a parallel circuit 90 which does not use a current transformer while performing the equivalent cancellation of inductive reactance at the frequencies discussed above. This embodiment is also intended for variable frequency operation in the same frequency range as FIG. 9. In place of the reflected capacitance from a secondary of a current transformer as illustrated in FIG. 9, the plurality of series series circuits 92–98 each contain a capacitor 100 and a switching element 102 which is selectably activated to connect in series with the feeder 14 one of four capacitances as illustrated. As can be seen, because a current transformer has not been used to reflect in the capacitance from the secondary, the capacitance values which are required in the parallel circuit are scaled up by a factor equal to the square of the turns ratio.

Figure 11:
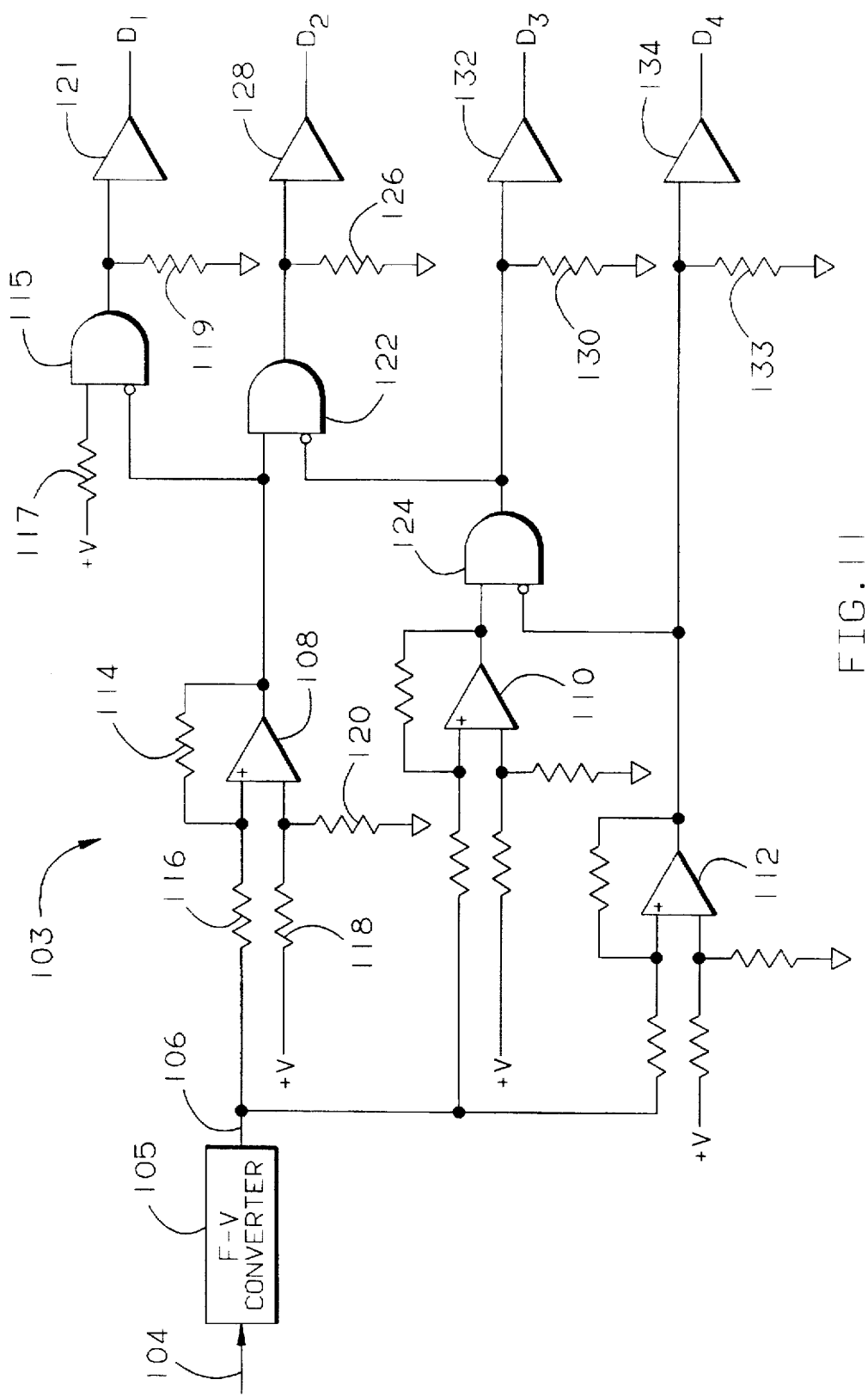
FIG. 11 illustrates a suitable control circuit for closing the switching elements of the series circuits of FIGS. 9 and 10 in response to a varied frequency of electrical power transmission.

FIG. 11 illustrates a control circuit 103 for selectively activating the switching elements 82 of FIG. 9 and 102 of FIG. 10 in proportion to the frequency of operation. The alternating current, which is variable in frequency, such as, but not limited to, 200 to 600 Hz, is applied at input 104 of a frequency to voltage converter 105 of conventional design. The control circuit 100 includes a frequency to voltage converter 102 of conventional design which has an input 104 responsive to the frequency of the alternating current being transmitted in the electrical power transmitting system. The output voltage produced on output 106 is an input to comparators 108, 110 and 112 of conventional design. Resistance values 114, 116, 118 and 120 for each of the comparators 108, 110 and 112 are chosen to provide each comparator with a different threshold at which the input voltage causes the comparator to switch from a low logic state to a high logic state. The output of comparator 108 is connected to an inverted input of AND gate 114 which has another input connected to the voltage V through a resistance 116. The output of AND gate 116 is connected to ground through resistance 118 and to amplifier 120 to produce the control signal $D_1$ for controlling the top switching element 82 and 102 in FIGS. 9 and 10 respectively. AND gate 122 has a first input connected to the output of comparator 108 and a second inverting input connected to the output of AND gate 124 which has a first input connected to the output of comparator 110 and a second inverted input which is connected to the output of comparator 112. The output of AND gate 122 is connected through resistor 126 to ground and to an input of amplifier 128 to produce the control signal $D_2$ for controlling the next to the top switching elements 82 and 102 in FIGS. 9 and 10 respectively. The output of AND gate 124 is connected to ground through resistor 130 and to the input of amplifier 132 to produce the control signal $D_3$ for controlling the next to the bottom switching elements 82 and 102 in FIGS. 9 and 10 respectively. The output of comparator 112 is connected through resistor 132 to ground and to the input of amplifier 134 to produce the control signal $D_4$ for controlling the turning on of the bottom switching element 82 and 102 in FIGS. 9 and 10 respectively.

The plurality of comparators 108, 110 and 112 each have an input coupled to the output voltage on output 106 of the frequency to voltage converter 105 and an output coupled to at least one control terminal D1–D4 of the switching elements 82 and 102 of FIGS. 9 and 10. Each comparator 108, 110, and 112 produces a low signal output state when the output voltage of the frequency to voltage converter 105 is below a threshold of the comparator which is determined by the resistance values of resistances 114, 116, 118 and 120 and a high output state when the output voltage of the frequency to voltage converter is above the threshold of the comparator. Each comparator has a different threshold which is chosen to control the switching of the appropriate capacitor in series with the feeder 14 for a particular portion of the frequency range between 200–600 Hz. The overall function of the control circuit 100 is to selectively switch on only one the signal outputs D1–D4 to a high level output state to connect one of the capacitors to the feeder 14 as the frequency of operation passes between 250 Hz., 350 Hz., 450 Hz. and 550 Hz. which are the threshold frequencies at which the capacitive values in the four series circuits 72, 74, 76 and 78 of FIG. 9 and 92, 94, 96 and 98 of FIG. 10 are to be selectively switched in series with the feeder.

Figure 5:
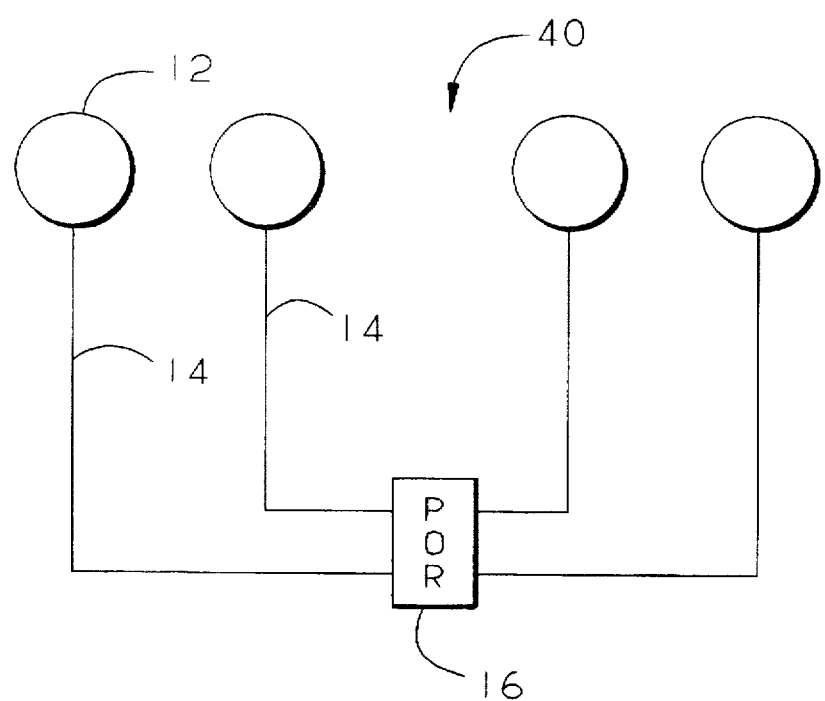
FIG. 5 illustrates a simplified diagram of an electrical power transmitting system for an airframe having a plurality of IDGs having feeders extending from the IDGs to a point of regulation.

The present invention produces substantial weight savings in a feeder of a typical electrical power transmitting system such as illustrated in FIG. 5. The present invention permits a downsizing of 150 KVA generators 12 illustrated therein with a rated current of 435 amps from 2-40 per phase wire to 1-40 per phase wire. The net permissible voltage drop across the feeder is set at 7.67 volts. To cancel the inductive effect of the feeder which has a voltage drop of 13.55 volts, it is necessary to insert in series with the feeder 14 a capacitor having an effective value of 12,773 µF which provides a capacitive voltage drop of 13.55 volts which produces a drop across the feeder of 5.894 $KVA_R$. Because of the size of this capacitance, a current transformer having a 20:1 turns ratio using a capacitor of 32 µF may be used. As described above, the weight of the 2-40 electrical wire required if capacitive compensation is not used is approximately 865 lbs., whereas the weight of 1-40 wire is approximately 430 lbs. The three necessary 400 Hz. current transformers weight approximately 15 lbs. and a 32 µF capacitors weighing approximately 1 lb. with the housing of another 5 lbs. for a total of 23 lbs. times four for total of 92 lbs. of additional weight is added by the current transformers and related capacitors and chassis. As a result, the net system weight savings is equal to 338 lbs. As can be seen, this savings is approximately 40%.

While a preferred application of the present invention is in airframes where reduction in weight is a major design concern, it should be understood that an electrical power transmitting system in accordance with the invention may have diverse applications where reduction of weight of feeders is beneficial.

While the invention has been described in terms of its preferred embodiments, it should be understood that numerous modifications may be made thereto without departing from the spirit and scope of the invention. It is intended that all such modifications fall within the scope of the appended claims.

We claim:

1. An electrical power transmitting system comprising:
    an alternating current electrical power generator for producing alternating current on an output having a specified maximum;
    at least one electrical load which is coupled to a point of regulation in the electrical power transmitting system;
    a feeder having a specified maximum voltage drop, a length extending between the output and the point of regulation for transmitting the alternating current to the point of regulation, an inductance having an inductive reactance at a fundamental frequency of the alternating current, a capacitance in series with the inductance having a capacitive reactance at the fundamental frequency of the alternating current which cancels at least part of the inductive reactance at the fundamental frequency of the alternating current to provide a reduced impedance in the feeder at the fundamental frequency of the alternating current to produce a reduced voltage drop which is less than the specified maximum voltage drop; and wherein
    the feeder has a minimum weight per unit length providing a maximum real current carrying capacity equal to the specified maximum at the reduced voltage drop.

2. An electrical power transmitting system in accordance with claim 1 wherein the capacitance comprises:
    a transformer having a primary and a secondary; and a capacitor in series with the secondary and the primary in series with the feeder which provides the capacitance in series with the inductance.

3. An electrical power transmitting system in accordance with claim 2 wherein:

the transformer has a variable number of turns.

4. An electrical power transmitting system in accordance with claim 3 wherein:

the transformer has a tap which is used to select the variable number of turns.

5. An electrical power transmitting system in accordance with claim 1 wherein the alternating current varies in frequency and the capacitance comprises:

a transformer having a primary and a secondary; and a circuit having a plurality series circuits connected in parallel, at least two of the series circuits each having a capacitor in series with a switching element, each capacitor being chosen to provide a capacitive reactance within a different range of the variation of frequency of the alternating current, the switching element in series with each capacitor being closed to connect the capacitor in series with the switching element in series with the secondary, one of the series circuits being the secondary and the primary being in series with the inductance.

6. An electrical power transmitting system in accordance with claim 5 further comprising:

each of the switching elements has a control terminal for controlling a switching state thereof to be in an open or closed state;

a frequency to voltage converter for producing an output voltage on an output;

a plurality of comparators, each comparator having an input coupled to the output and a comparator output coupled to at least one control terminal, and producing a low signal state on the comparator output when the output voltage of the frequency to voltage converter is below a threshold of the comparator and a high signal state on the comparator output when the output voltage of the frequency to voltage converter is above the threshold of the comparator with each comparator having a different threshold selected to control switching from the low to the high signal state for a different frequency within the range of frequencies; and a plurality of logic gates, each logic gate having at least one input coupled to a comparator output and another input coupled to another comparator output or to a reference voltage and an output coupled to a different control terminal.

7. An electrical power transmitting system in accordance with claim 6 wherein:

the logic gates are AND gates with one of the inputs inverting an output from a comparator.

8. An electrical power transmitting system in accordance with claim 2 wherein:

the system is disposed in an airframe.

9. An electrical power transmitting system in accordance with claim 3 wherein:

the system is disposed in an airframe.

10. An electrical power transmitting system in accordance with claim 4 wherein:

the system is disposed in an airframe.

11. An electrical power transmitting system in accordance with claim 5 wherein:

the system is disposed in an airframe.

12. An electrical power transmitting system in accordance with claim 6 wherein:

the system is disposed in an airframe.

13. An electrical power transmitting system in accordance with claim 7 wherein:

the system is disposed in an airframe.

14. A method of transmitting electrical power in an electrical power transmitting system comprising:

producing alternating current from an electrical power generator on an output having a specified maximum;

connecting at least one electrical load to a point of regulation in the electrical power transmitting system;

connecting a feeder having a specified maximum voltage drop, a length extending between the output and the point of regulation for transmitting the alternating current to the point of regulation with the feeder having an inductance having an inductive reactance at a fundamental frequency of the alternating current;

connecting a capacitor in series with the inductance with the capacitor having a capacitive reactance at the fundamental frequency of the alternating current which cancels at least part of the inductive reactance at the fundamental frequency of the alternating current to provide a reduced impedance in the feeder at the frequency of the fundamental frequency of the alternating current to produce a reduced voltage drop which is less than the specified voltage drop; and the feeder is chosen to have a minimum weight per unit length which provides a real maximum current carrying capacity equal to the specified maximum at the reduced voltage drop.

15. A method of transmitting electrical power in an electrical power transmitting system in accordance with claim 14 further comprising:

providing a transformer having a primary and a secondary and a capacitor in series with the secondary with the primary being connected in series with the feeder to provide the capacitance in series with the inductance.

16. A method of transmitting electrical power in an electrical power transmitting system in accordance with claim 14 comprising:

providing a transformer having a primary and a secondary and a circuit having a plurality of series circuits connected in parallel, at least two of the series circuits having a capacitor in series with a switching element with each capacitor being chosen to provide a capacitive reactance within a range of frequencies of alternating current when the switching element in series with one capacitor is closed and one of the series circuits being the secondary of the transformer and the primary being in series with the feeder.

17. A method of transmitting electrical power in an electrical power transmitting system in accordance with claim 16 further comprising:

in response to variation in the range of frequencies of the alternating current producing control signals which are coupled to each switching element for controlling the switching of the switching elements to connect at any one time throughout the range of frequencies only a single capacitor in series with the secondary as the frequency of the alternating current varies through the range of frequencies.

18. A method of transmitting electrical power in an electrical power transmitting system in accordance with claim 14 further comprising:

providing the electrical power transmitting system in an airframe.

19. A method of transmitting electrical power in an electrical power transmitting system in accordance with claim 15 further comprising:

providing the electrical power transmitting system in an airframe.

20. A method of transmitting electrical power in an electrical power transmitting system in accordance with claim 16 further comprising:

providing the electrical power transmitting system in an airframe.

21. A method of transmitting electrical power in an electrical power transmitting system in accordance with claim 17 further comprising:

providing the electrical power transmitting system in an airframe.

* * * * *